UNITED STATES PATENT OFFICE.

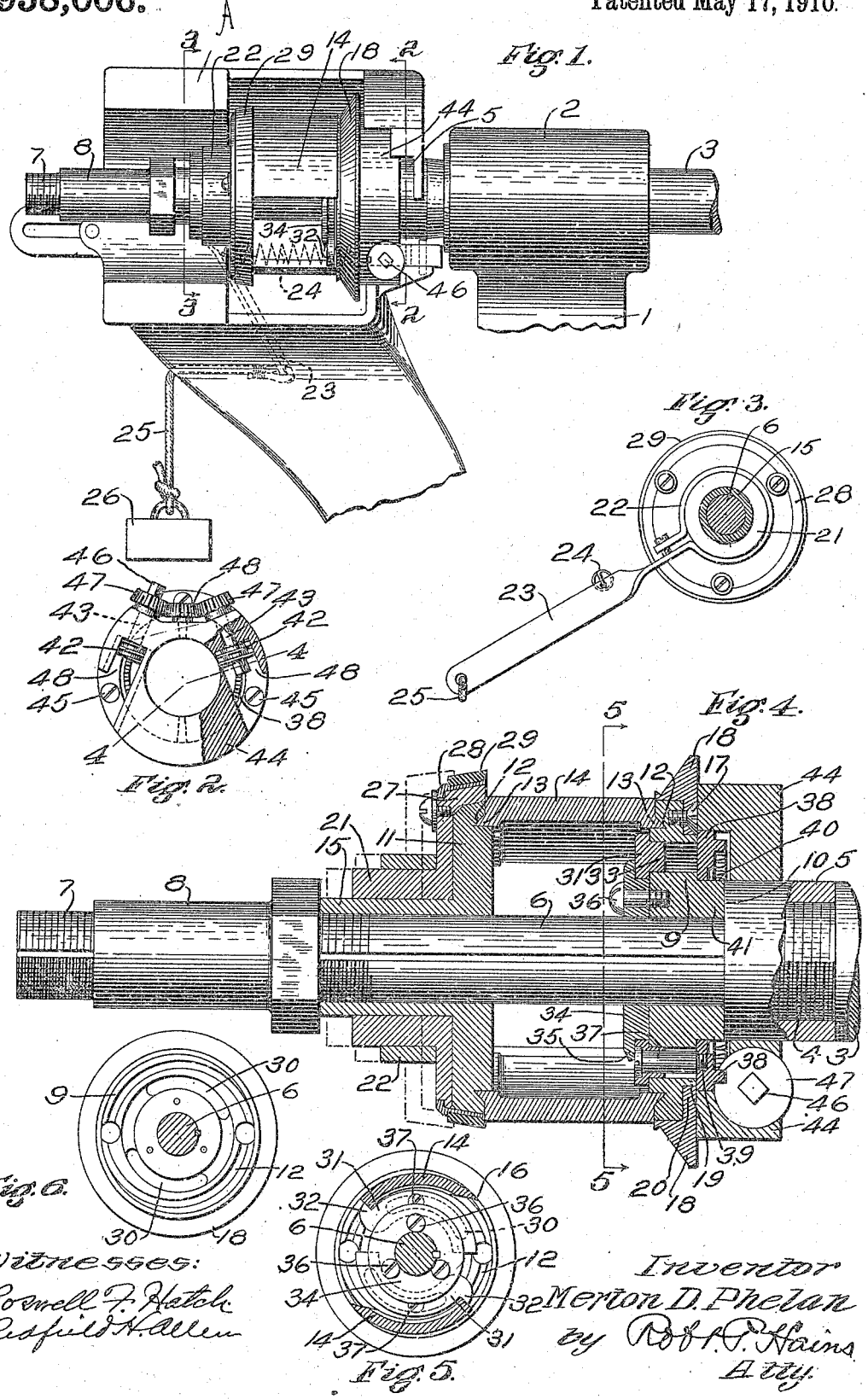

MERTON D. PHELAN, OF DORCHESTER, MASSACHUSETTS, ASSIGNOR TO THOMAS G. PLANT, OF BOSTON, MASSACHUSETTS.

HEEL-SHAVER.

958,006.  Specification of Letters Patent.  Patented May 17, 1910.

Application filed June 12, 1909, Serial No. 501,738. Renewed April 12, 1910. Serial No. 554,962.

*To all whom it may concern:*

Be it known that I, MERTON D. PHELAN, a citizen of the United States, residing at Dorchester, in the county of Suffolk and State of Massachusetts, have invented an Improvement in Heel-Shavers, of which the following description, in connection with the accompanying drawings, is a specification, like characters on the drawings representing like parts.

The invention to be hereinafter described relates to heel trimming machines of that type employing a rotary head carrying knives or cutters, and more particularly to the means for supporting and adjusting the cutters to compensate for wear incident to use or grinding.

The aims and objects of the present invention are to provide simplified and effective means for adjusting the knives to position and maintain the cutting edge of the knives in proper position, all of which will be more fully hereinafter described, and then definitely set forth in the claims.

In the drawings:—Figure 1 is a side elevation of sufficient portions of a heel trimming machine to illustrate the use of the present invention in connection therewith, part of the supporting standard and dust trunk being broken away; Fig. 2 is a section on the line 2—2, Fig. 1; Fig. 3 is a section on the line 3—3, Fig. 1; Fig. 4 is a section on the line 4—4, Fig. 2; Fig. 5 is a section on the line 5—5 of Fig. 4, reduced in size; and Fig. 6 is a face view of the rear knife supporting collar and toplift rest detached, the supporting shaft being indicated in said figure as in cross section.

In the drawing, 1 represents any usual or suitable form of supporting standard having a bearing 2 for the driving shaft 3 which may be driven from any suitable source of power, not shown. The driving shaft 3, see Fig. 4, has a screw-threaded forward portion 4 which is engaged by the interiorly screw-threaded collar 5 secured to or formed as part of the shaft 6, which for identification may be known as the cutter head supporting shaft, the end portion of said shaft being provided with an exterior screw thread 7 to be engaged by an interiorly screw-threaded nut 8 for holding the cutter head, designated as a whole by A, on said shaft as will hereinafter more fully appear. Mounted on and splined to the cutter head supporting shaft 6 is the knife supporting collar 9 bearing against the shoulder 10 formed by the collar 5, Fig. 4. Disposed upon the cutter head supporting shaft 6 opposite the knife supporting collar 9 is another knife supporting collar 11, said collars having suitable segmental or eccentric grooves 12 in which the edges 13 of the knives 14 rest when the parts are in assembled condition, as well understood by those skilled in the art. The knife supporting collar 11 has a sleeve portion 15, extending along the cutter head supporting shaft 6, which is adapted to be engaged by the clamping nut 8 to force the knife supporting collars toward each other and maintain the knives in their assembled relation with respect to the knife supporting collars, as will be obvious. By reason of the segmental or eccentric grooves in the knife supporting collars and the coacting ribs or edges 13 on the knives 14, it will be obvious that the cutting edges 16, Fig. 5, of the knives may be maintained in proper radial relation with the supporting collars to do the work intended, while the rear portions of the knives extending backward from said cutting edges will have sufficient clearance, as will be well understood by those skilled in the art.

Secured to the rear knife supporting collar 9, as by screws 17, Fig. 4, is the toplift rest 18 which may be of usual character, said knife supporting collar 9 having a shouldered portion 19 on which a corresponding shoulder 20 of the toplift rest 18 is supported, as will be clearly apparent from Fig. 4.

Surrounding the sleeve portion 15 of the forward knife supporting collar 11 is a sleeve 21, Fig. 4, said sleeve being movable back and forth longitudinally on the sleeve 15 and being embraced by a clamping portion 22 of an arm 23, Fig. 3, said arm having suitable means, such as the spring 24 and cord and weight 25 and 26, respectively, normally acting to hold the sleeve 21 to the right, Figs. 1 and 4. The sleeve 21 carries the counter guard, which may be of any usual or desired character, that in the present illustration comprising the flanged portion 27 carried by the sleeve 21 and having a circumferential seat for a ring 28 carrying a rubber or other suitable non-metallic contacting element 29 to engage the counter of the shoe. This counter guard does not form part of the present invention, and either it or any other usual form of counter guard may be employed so far as the present invention is concerned.

From the construction thus far described it will be apparent that the heel of a shoe being presented to the cutters in the usual manner, that is with the edge of the toplift resting on the flange of the toplift rest and the counter of the shoe engaged by the counter guard, the knives will trim the heel in the manner well understood by those skilled in the art. As the edges of the knives become worn either by grinding or in their action upon the stock, it is apparent that some means must be provided for adjusting the knives to bring their cutting edges again into proper cutting position because, the knives being held in the segmental grooves of the supporting collars, as the edges wear away these edges will not be flush with the edge of the toplift gaging flange, so that the heel will not be properly trimmed unless the knives are moved forward in their segmental or eccentric grooves to bring the edges into proper position for action upon the heel.

The knife supporting collar 9 is provided with curved slots 30 corresponding to the number of knives employed, see Figs. 4 and 6, and movable in each of these slots is a backer bar 31 having a knife supporting lip 32 to engage the rear of a knife 14, there being a separate and independent backer bar for each of the knives, as indicated in Fig. 5. Each backer bar is guided in a slot 30 on the knife supporting collar 9 by appropriate means, that indicated in Fig. 4 comprising a reduced portion 33 on the rear side of the backer bar, which fits the slot 30 and guides the backer bar in its movement, as will be readily understood. A face plate 34 has a flange portion 35, Fig. 4, overlapping the faces of the backer bars, and is secured to the knife supporting collar 9 by a suitable means, as the screws 36, Figs. 4 and 5, the construction being such that the backer bars may be moved, each in its respective slot 30 in the knife supporting collar, to adjust its knife and bring the edge thereof into proper cutting position.

Each of the separate backer bars 31 is provided with a pin 37, Figs. 4 and 5, projecting therethrough and having the head thereof preferably flush with the face of the backer bar, as indicated in Fig. 4, so as not to interfere with the guiding function of the flange 35, as hereinbefore described. The opposite end of each of the pins 37 is preferably somewhat reduced in diameter and screw-threaded into a segmental rack 38, as indicated at 39, Fig. 4, it being understood that each of the separate backer bars is connected to a separate segment rack 38, so that upon movement of the segment racks the connected backer bars will be appropriately moved in the slots 30 of the knife supporting collar.

The segment racks 38 may be seated for rotative movement upon appropriate bearings 40 formed on a hub portion 41 of the knife supporting collar 9.

As one form of means for operating the segment racks 38 and consequently moving the backer bars, the top of each segment rack, see Fig. 2, is engaged by a worm 42, there being a separate worm for each rack, and each of said worms being mounted upon a suitable shaft 43 mounted for rotative movement in a casing or collar 44 secured to the knife supporting collar so as to rotate therewith, as by the screws or other suitable means 45, Fig. 2, said screws, in the present embodiment of the invention, passing through the flanged portion of the toplift rest 18, the construction being such that upon rotation of the shafts 43 and worms 42 the segment racks 38 will be moved and correspondingly move the connected backer bars 31 to adjust the knives, as hereinbefore pointed out.

One of the shafts 43 is provided with a squared end 46 by which it may be turned, and has mounted thereon a bevel gear 47, the other worm shaft 43 being also provided with a bevel gear 47, said bevel gears being operatively connected by means of an idle gear 48 disposed between them, the construction being such that upon rotation of one of the shafts 43, the other shaft will be correspondingly rotated in the same direction so as to move the backer bars and consequently the knives forwardly in the same direction and consequently properly position the cutting edges thereof.

It will be obvious to those skilled in the art that the segment racks 38 may be separately adjusted if desired so as to give a corresponding adjustment to each connected backer bar and its coacting knife, and it will be likewise understood that various changes may be made in the form and character of the parts and their assembled relation without departing from the spirit of the present invention.

It will be noted that the casing or collar 44 is provided with suitable recesses 48 for the reception of the worms 42 and also for the manipulation of the attached screws 45 in connecting the casing or collar 44 to the knife supporting collar.

It will also be noted that when the knives become worn it is only necessary to apply a wrench to the squared head 46 of one of the worm shafts 43 and, by turning it in suitable direction, the separate backer bars may be moved, each in its guiding slot, to adjust its knife in proper cutting relation with the coacting parts.

What is claimed is:

1. In a heel trimmer, the combination of a shaft, a knife supporting collar mounted on said shaft and provided with eccentric knife sustaining grooves, knives having ribs engaging said eccentric grooves, a separate backer bar for each knife, and means for simultaneously adjusting the backer bars to bring the cutting edges of the knives into proper cutting position.

2. In a heel trimmer, the combination of a shaft, a knife supporting collar mounted on said shaft and provided with eccentric knife sustaining grooves, knives having ribs engaging said eccentric grooves, a separate backer bar for each knife, a segment connected to each backer bar, and means for adjusting the segments to bring the cutting edges of the knives into proper cutting position.

3. In a heel trimmer, the combination of a shaft, a knife supporting collar rotatable with said shaft and having eccentrically disposed knife sustaining grooves and concentric guiding slots, knives having ribs engaging said grooves, a separate backer bar for each knife, each backer bar engaging and being guided by one of said concentric guiding grooves in the knife supporting collar, and means for adjusting each backer bar to bring the cutting edge of the knives into proper cutting position.

4. In a heel trimmer, the combination of a shaft, a knife supporting collar rotatable with said shaft and having eccentrically disposed knife sustaining grooves and concentric guiding slots, knives having ribs engaging said grooves, a separate backer bar for each knife, each backer bar engaging and being guided by one of said concentric guiding grooves in the knife supporting collar, a separate rack connected to each backer bar, and means for adjusting the racks.

5. In a heel trimmer, the combination of a shaft, a knife supporting collar mounted on said shaft and provided with eccentric knife sustaining grooves, knives having ribs engaging said eccentric grooves, a separate backer bar for each knife, a segment rack for each backer bar, a worm engaging each segment rack, and means for operating the worms to move the backer bars.

6. In a heel trimmer, the combination of a shaft, a knife supporting collar rotatable therewith, a knife sustained eccentrically with relation to said collar, a backer bar having a lip engaging said knife, a segment rack connected to said backer bar, and means for moving the segment rack to position the cutting edge of the knife.

7. In a heel trimmer, the combination of a shaft, a knife supporting collar rotatable therewith, knives sustained eccentrically by said collar, said knife supporting collar having concentric slots, a separate backer bar for each knife guided by said slots, a separate rack for each backer bar, means for connecting a backer bar to its rack, and means for operating the rack.

8. In a heel trimming machine, the combination of a driving shaft, a cutter head supporting shaft, knife supporting collars carried by the cutter head supporting shaft, knives disposed between said collars, a clamping nut to hold the collars with the knives supported between them, a separate backer bar for each knife, and operating devices for each backer bar, said backer bars and devices being connected to one of said collars, and means for detachably connecting the cutter head supporting shaft with the driving shaft.

In testimony whereof, I have signed my name to this specification, in the presence of two subscribing witnesses.

MERTON D. PHELAN.

Witnesses:
ROSWELL F. HATCH,
REDFIELD H. ALLEN.